United States Patent
Yagi et al.

Patent Number: 5,711,903
Date of Patent: Jan. 27, 1998

[54] METHOD OF MANUFACTURING A POROUS PREFORM FOR AN OPTICAL FIBER

[75] Inventors: Takeshi Yagi; Masato Oku, both of Yokohama; Takayuki Morikawa, Tokyo; Tsuguo Sato, Souka; Kazuaki Yoshida, Yokohama, all of Japan

[73] Assignee: The Furukawa Electric Co., Ltd., Tokyo, Japan

[21] Appl. No.: 698,287

[22] Filed: Aug. 14, 1996

Related U.S. Application Data

[63] Continuation of Ser. No. 336,781, Nov. 9, 1994, abandoned.

[30] Foreign Application Priority Data

| Nov. 15, 1993 | [JP] | Japan | 5-284714 |
| Jun. 20, 1994 | [JP] | Japan | 6-137120 |
| Aug. 31, 1994 | [JP] | Japan | 6-207756 |

[51] Int. Cl.⁶ ............ B29D 11/00; B27N 3/00; B29C 59/00

[52] U.S. Cl. ............ 264/1.21; 134/2; 264/1.24; 264/1.29; 264/109; 264/122

[58] Field of Search ............ 134/2; 264/1.21, 264/1.24, 1.29, 109, 122; 423/335, 336, 337, 338, 339, 340

[56] References Cited

U.S. PATENT DOCUMENTS

| 5,167,885 | 12/1992 | Rice et al. | 264/56 |
| 5,314,520 | 5/1994 | Yagi et al. | 65/3.11 |
| 5,366,669 | 11/1994 | Quadir et al. | 264/6 |

FOREIGN PATENT DOCUMENTS

| 58-26048 | 2/1983 | Japan. |
| 60-210539 | 10/1985 | Japan. |
| 61-256937 | 11/1986 | Japan. |
| 63-55132 | 3/1988 | Japan. |
| 63-195136 | 8/1988 | Japan. |
| 64-56331 | 3/1989 | Japan. |
| 4-124042 | 4/1992 | Japan. |
| 4-124043 | 4/1992 | Japan. |
| 5-208839 | 8/1993 | Japan. |

*Primary Examiner*—Christopher A. Fiorilla
*Attorney, Agent, or Firm*—Frishauf, Holtz, Goodman, Langer & Chick, P.C.

[57] ABSTRACT

The present invention provides a method of manufacturing a porous preform for an optical fiber, including the steps of removing impure particles from silica powder while being stirred in an alkaline liquid phase, and obtaining the porous preform for an optical fiber by applying the powder forming method to the silica powder used as a main raw material. The present invention further has a method of manufacturing a porous preform for an optical fiber, including the step of preparing a forming material by adding fine particles having a particle diameter satisfying the following formula (I) to the silica powder, and obtaining the porous preform by applying the powder forming method to the forming material:

$$d \leq \{(2/\sqrt{3}) - 1\} \cdot D \quad (I)$$

wherein d: diameter of fine particles, and D: diameter of silica powder.

17 Claims, 2 Drawing Sheets

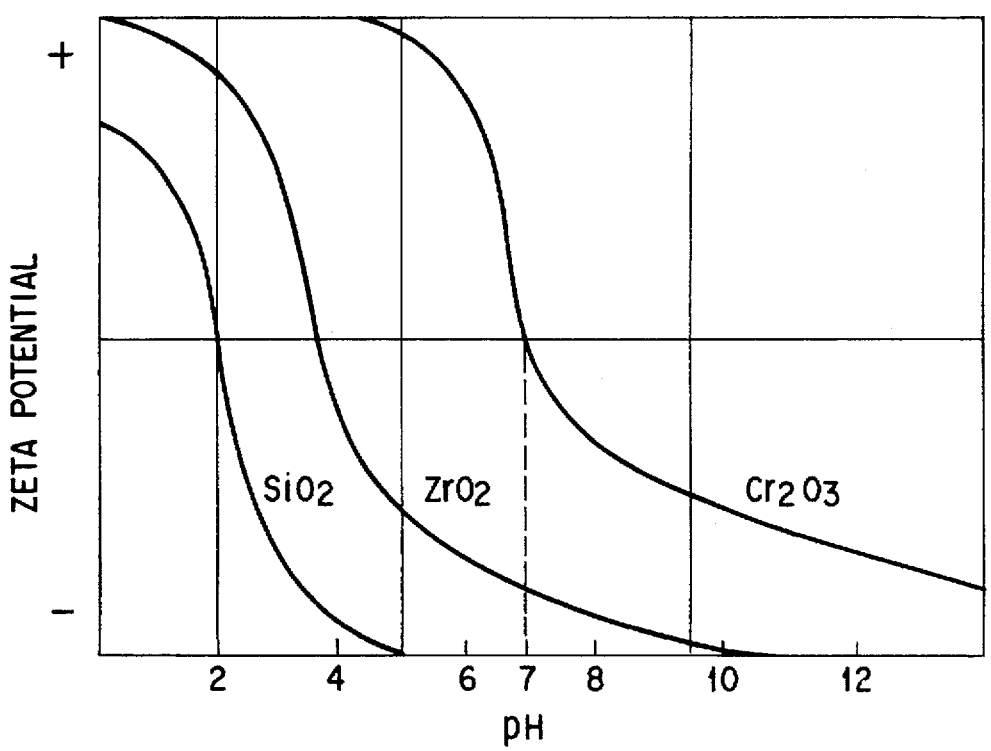
F I G. 1
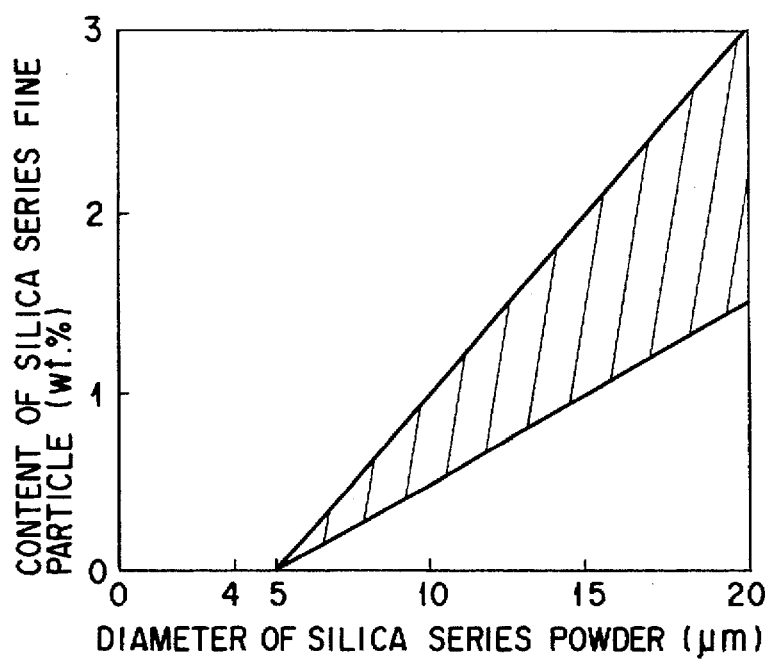
F I G. 2

METHOD OF MANUFACTURING A POROUS PREFORM FOR AN OPTICAL FIBER

This is a Continuation of application Ser. No. 08/336,781, filed Nov. 9, 1994, now abandoned.

BACKGROUND OF THE INVENTION

1. Field of the Invention

The present invention relates to a method of manufacturing a porous preform for producing an optical fiber for use in the optical communication field.

2. Description of the Related Art

An optical-fiber preform for producing an optical fiber is formed by the powder forming method using a silica powder as a raw material. Various powder forming methods are available. Among these are the extrusion, pressing, casting, MSP (Mechanically Shaped Preforms) method, centrifugal separation method, and so-called double-process method, which are respectively disclosed in Jpn. Pat. Appln. KOKAI Publications No. 4-124042, No. 4-124043, No. 64-56331, No. 60-210539, No. 63-195136, and No. 58-26048.

The aforementioned powder forming methods have a drawback in that the silica powder is susceptible to contamination with metal-compounds such as $ZrO_2$ and $Cr_2O_3$, while being prepared and while being transported. Unless the metal compounds are removed from the silica powder, they will be incorporated into a final product i.e., an optical fiber, via an intermediate i.e., a porous preform. Breakage of the optical fiber may develop at the point where the metal compounds are present. The resultant optical fiber thus has far less strength than desired.

Jpn. Pat. Appln. KOKAI Publication No. 5-208839 discloses that the silica powder preferably has a particle diameter within a range of 0.6 to 20 μm if an optical fiber preform is formed by the aforementioned powder forming method.

According to this publication, the smaller the diameter in the silica powder, the smaller the pores in the porous preform. As a result, it is more difficult to diffuse a purification gas used in a later purification step, such as a chlorine gas, or a chloride gas generated from the reaction between the chlorine gas and impurities. The purification efficiency of the porous preform inevitably decreases. On the other hand, if the silica powder has excessively large particle diameter, the porous preform will have low mechanical strength after a binder is removed from the porous preform in a degreasing step. Consequent formability of the porous preform will be insufficient and the porous preform will have tendency to break.

From a qualitative point of view of the optical fiber (the final product), it is desirable to use the silica powder having as large a particle diameter as possible. If the silica powder having a large particle diameter is used, the problem remains of how to improve the mechanical strength of the porous preform for an optical fiber.

SUMMARY OF THE INVENTION

A first object of the present invention is to provide a method of manufacturing a porous preform for an optical fiber, capable of producing an optical fiber having sufficient strength and with no contamination of metals.

A second object of the present invention is to provide a method of manufacturing a porous preform for an optical fiber, capable of producing an optical fiber of excellent mechanical strength as well as of high quality.

The present inventors directed their attention to electrification states of metal compounds such as $ZrO_2$ and $Cr_2O_3$ contained as impurities. They found that the metal compounds can be removed by taking advantage of the fact that electric charges of the metal compounds are equal to each other in a specific liquid phase. As a result, they have accomplished the first aspect of the present invention.

According to the first aspect of the present invention, there is provided a method of manufacturing a porous preform for an optical fiber, comprising the steps of removing impure particles from a silica powder while the silica powder is being stirred in an alkaline liquid phase; and obtaining the porous preform for an optical fiber by applying the powder forming method to the resultant silica powder used as a main material.

The present inventors further conducted studies with a view toward activating interaction between particles of silica powder having a relatively large particle diameter. They found that if silica fine particles are added to the silica powder having relatively large-diameter particles, the number of contact points therebetween per unit volume increases, contributing to improvement of the mechanical strength of the porous preform. As a result, they accomplished the second aspect of the present invention.

According to the second aspect of the present invention, there is provided a method of manufacturing a porous preform for an optical fiber, comprising the steps of obtaining a forming material by adding fine particles having a particle diameter satisfying the following formula (I) to the silica powder; and obtaining a porous preform by applying the powder forming method to the forming material.

$$d \leq \{(1/\sqrt{3}) - 1\} \cdot D \qquad (I)$$

(d: diameter of fine particles, D: diameter of silica powder)

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a typical diagram showing electrification states of metal oxides in water, FIG. 2 is a graph showing the most suitable amount range of silica fine particles to be added to a silica-series powder.

DETAILED DESCRIPTION OF THE PREFERRED EMBODIMENTS

Figure 3A:
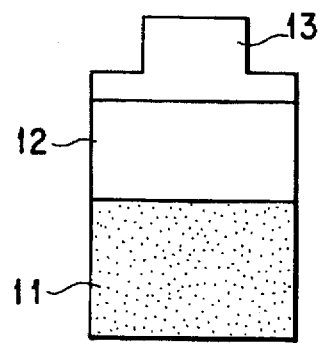
FIGS. 3A, 3B, 3C, and 3D are views showing steps of removing impurities from a silica powder.

In the first and the second aspects of the invention, applicable silica powders are those obtained by the flame hydrolysis method, sol-gel method, and gas-phase synthesis method, or the like. More specifically, the applicable silica powder is an $SiO_2$ powder, or an $SiO_2$ powder containing an element such as Ge, B, or Ti for controlling a refraction index, or containing an element such as Er or Nd for imparting functional characteristics to the powder.

In the first aspect of the invention, impure particles refer to mainly $ZrO_2$ and $Cr_2O_3$ particles. The alkaline liquid phase is defined as one having a pH value exceeding 7, and more preferably, having a pH value of 9 or more. The liquid phase is prepared by adjusting the pH of an alkaline aqueous solution such as aqueous ammonia.

The first aspect of the present invention is characterized in that impure particles are removed from the silica powder while the powder is being stirred in the alkaline liquid phase. Impurity particles such as $ZrO_2$ and $Cr_2O_3$ particles usually attach onto silica powder, i.e., $SiO_2$ particles serving as a main raw material. As is apparent from FIG. 1, in the range of alkali exceeding pH 7, $SiO_2$, $ZrO_2$, and $Cr_2O_3$, all have a negative zeta potential, in other words, all are negatively charged. While the $SiO_2$ particles with the $ZrO_2$ and the $Cr_2O_3$ particles attached thereto are being stirred in the alkaline liquid phase, the $ZrO_2$ and the $Cr_2O_3$ particles are separated from the $SiO_2$ particles due to the repulsion between all negatively charged particles. In this way, the impure particles such as $ZrO_2$ and $Cr_2O_3$ particles can be successfully removed from the $SiO_2$ particles. In FIG. 1, all particles are positively charged with a pH range of 2 or less. However, such a liquid phase of pH 2 is not desirable since it is very dangerous to handle due to its strong acidity.

Preferably, fine particles to be used in the second aspect of the present invention are a silica powder of a high purity which is selected from those obtained through the aforementioned methods. Examples of such pure silica fine particles/silica fine particles containing an element such as Ge, P, or Ti for controlling a refraction index, or containing an element such as Er or Nd for imparting functional characteristics, or oxides fine particles of the aforementioned elements.

In the second aspect of the present invention, the diameter of fine particles to be added to the silica powder is defined by the following formula:

$$d \leq \{(2/\sqrt{3})-1\} \cdot D \quad (I)$$

(d: diameter of fine particles, D: diameter of silica powder). If the diameter of the fine particles is not much smaller than that of the silica powder, in other words, if the diameter satisfies a formula:

$$d > \{(2/\sqrt{3})-1\} \cdot D,$$

the difference in size between the fine particles and the particles of the silica powder disappears. As a result, the fine particles cannot enter the space formed between particles of the silica powder, thus failing to make its contribution to the increase of contact points between the silica powder and the fine particles. For example, in the case where the diameter of the silica powder is 10 µm, it is necessary to set the diameter of the fine particles to 1.5 µm or less so as to satisfy the aforementioned formula. Furthermore, in order to allow the fine particles to attach onto the so-called neck portion formed near the contact point of particles of the silica powder, it is necessary to set the particle diameter to a value sufficiently smaller than the diameter derived from the aforementioned formula. The particle diameters of the silica powder and fine particles according to the second aspect of the present invention are defined as an average particle diameter thereof, and defined as a generally-used volume 50% particle diameter.

In the second aspect of the present invention, the amount of the fine particles added to the silica powder also has an influence on the mechanical strength of the porous preform. The lowermost content of the fine particle is the lowest value at which the mechanical strength of the porous preform can be maintained. The uppermost content of the fine particles is the highest value at which the porous preform maintains a uniform state by suppressing aggregation of extra fine particles not participating in the increase of contact points with silica powder. If the porous preform is in a non-uniform state, cracks and distortion will be developed in the porous preform during heat treatment of later processes such as a degreasing step, a purification step, and a vitrifying step.

As explained above, there is the most suitable range in the amount of fine particles added to the silica powder. However, the range varies depending on a particle diameter of the silica powder. More specifically, when the particle diameter of the silica powder employed is large, fine particles should be added to the silica powder in a larger amount so as to maintain the mechanical strength of the porous preform. To determine the most suitable amount range of the fine particles to be added to the silica powder, several silica powders within the particle diameter range of 4 to 20 µm were tested. As the fine particles, those having a diameter in the range of 0.04 to 0.6 µm were selected from the particles satisfying the formula (I) for the reason that they had a particularly remarkable effect on mechanical strength. The results are shown in FIG. 2. The most suitable amount range for the fine particles is within the hatched area surrounded by two solid lines on FIG. 2. According to FIG. 2, when a silica powder of 10 µm in particle diameter is used, a preferable amount of the fine particles to be added is 0.5 to 1% by weight. When silica powder has 15 µm in particle diameter, it is preferable to add the fine particles in an amount of 1 to 2% by weight. In the case of a silica powder of 5µ or less in particle diameter, the addition of the fine powder is not required since the particle diameter of the silica powder is sufficiently small.

In the second aspect of the present invention, the following method is the most preferable one in order to add the silica fine particles to the silica powder. First, the silica powder and the silica fine particles are dispersed in a dispersion medium such as pure water to obtain a slurry, and then, the slurry is stirred so as to homogeneously disperse the silica fine particles in the silica powder. If this method is employed, the dispersion medium can be dried in short time since the spray-dry method can be applied to the slurry after stirring. As a result, segregation of the fine particles from the silica powder can be prevented when the slurry is dried.

The method of manufacturing a porous preform for an optical fiber according to the second aspect of the present invention is characterized in that the porous preform is obtained by applying the powder forming method to a forming material which is prepared by adding fine particles having a diameter satisfying the following formula to a silica powder.

$$d \leq \{(2/\sqrt{3})-1\} \cdot D \quad (I)$$

(d: diameter of fine particles, D: diameter of silica powder)

In general, compared to the case of using the silica-series powder having smaller-diameter particles, in the case of employing the silica powder having relatively larger particle diameter, the number of contact points per unit volume between particles of the silica powder is smaller. Since interaction between particles of the silica powder is poor, the mechanical strength of the porous preform obtained decreases. In this case, however, if fine particles satisfying the aforementioned formula are added to the silica powder in a predetermined amount, fine particles enter into the space between particles of the silica powder, increasing the number of the contact points between the silica powder and fine particles. In particular, if fine particles used herein have sufficiently smaller particle diameter than that of the particles of the silica powder, the fine particles attach to the so-called neck portion formed near the point at which the silica particles are contact to each other. By this, the interaction between particles, that is, the tangling of the silica powder and fine particles, aggregation force based on the interaction, and surface tension or capillary force ascribed to water remaining on the contact surface between the particles are augmented. Consequently, the mechanical strength of the resultant porous preform can be improved.

Particularly, the method of the second aspect of the present invention is effective if applied to the raw material powder from which impure particles have been removed by taking advantage of the difference in the sedimentation velocity while the powder is dispersed in an alkaline solution according to the first aspect of the present invention. According to the method of the first aspect of the present invention, when the impure particles are removed, small particles are removed together with the impure particles from the raw material powder, with the result that large vacant space between particles is produced. However, if the fine particles are added to the powder in accordance with the method of the second aspect of the present invention, the fine particles enter the vacant space and increase the number of the contact points. In this way, the methods of the first aspect and the second aspect of the present invention can be appropriately used in combination in manufacturing the porous preform for an optical fiber. To be more specific, the impure particles are removed from the silica powder by the method of the first aspect of the invention. To the silica powder, fine particles satisfying the formula of the second aspect of the present invention are added. Thereafter, the powder forming method is applied to the particle mixture to produce the porous preform. In this way, it is possible to obtain a porous preform for an optical fiber, having sufficient mechanical strength, excellent quality, and no contamination with metal compounds.

Recently, the sol-gel method has been paid attention since it produces powder having a high purity. A powder synthesized by the sol-gel method has a narrow particle-diameter distribution affected by the characteristics of the synthesis process. Such particles do not contain small particles serving as the fine particles of the second aspect of the present invention. In this case, it is effective to apply the method of the second aspect of the present invention in increasing the number of contact points between particles.

The methods of the first and the second aspects of the present invention can be applied to the production of a porous preform used in a PCS (Polymer Clad Silica) fiber, a porous preform used in image guide, a stick-shape porous body such as a porous preform used in rod lenses, a hybrid-type porous preform formed of a core rod around which silica powder is placed as disclosed in Jpn. Pat. Appln. KOKAI Publication No. 4-124043, and a porous preform, a core and a clad of which are formed by means of the powder forming method.

In the methods of the first and the second aspects of the present invention, granulated powder obtained by the spray drying are charged in a mold and pressurized to obtain the porous preform. As the powder forming method, it is preferred to employ, for example, the pressing disclosed in Jpn. Pat. Appln. KOKAI Publication No. 4-124043, and the MSP method disclosed in Jpn. Pat. Appln. KOKAI Publication No.60-210539. Further, the present invention can employ the extrusion, casting so-called double-process method, respectively disclosed in Jpn. Pat. Appln. KOKAI Publications No. 4-124042, No. 64-56331, and No. 58-26048.

Hereinbelow, Examples of the present invention will be specifically described.

(EXAMPLE 1)

Figure 3B:
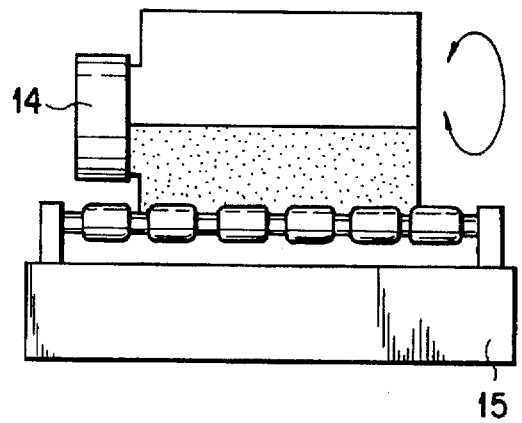
Figure 3C:
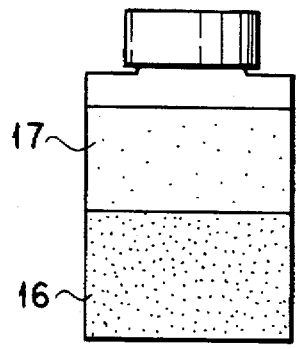

Hereinbelow, a step of removing impure particles of the first aspect of the present invention will be explained. As shown in FIG. 3A, an alkaline solution 12, which had been prepared from an aqueous ammonia by adjusting its pH to 9 to 10, was mixed with silica powder 11 having an average diameter of 8 μm produced by the gas-phase synthesis method, in an equal weight to each other. The resultant mixture was placed in a container 13. After a cover 14 was attached to the container 13, as shown in FIG. 3B, the container was placed such that the longitudinal axis thereof is positioned horizontally on a roll mill 15. The content of the container 13 was sufficiently stirred by rolling the container on the roll mill 15. The container 13 was placed such that the longitudinal axis is vertically positioned and allowed to stand still for 8 hours as it was, as shown in FIG. 3C. The content of the container 13 was thereby separated into silica powder precipitate 16 and a supernatant 17. The impure particles were still remained being dispersed in the supernatant 17 due to slight difference in sedimentation velocity.

Figure 3D:
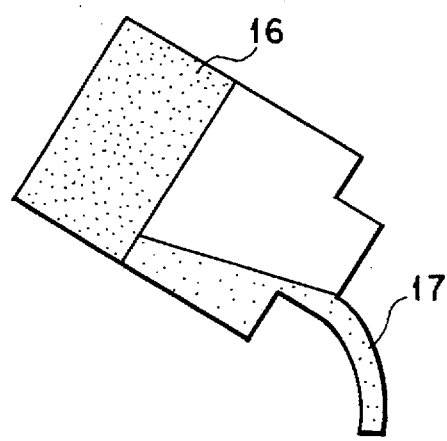

Thereafter, only the supernatant 17 containing the impure particles dispersed therein was removed, as shown in FIG. 3D. The operations from FIG. 3A to FIG. 3D were repeated. The same operations from FIG. 3A to FIG. 3D were further performed twice using pure water instead of the alkaline solution. Through two-time alkali wash followed by two-time pure-water wash as mentioned above, silica powder free from impure particles was obtained. To 100 parts by weight of the resultant silica powder, 67 parts by weight of pure water and 1.6 parts by weight of a polyvinyl alcohol, and 1.2 parts by weight of glycerine were added and stirred to obtain a slurry. The slurry was granulated by a spray-dryer device, resulting in granulated powder having a particle diameter of 100 μm.

In a second step, a quartz glass rod was formed by the VAD method. The quartz glass rod had a clad/core ratio of approximately 3, a specific refractive index of approximately 0.3%, an outer diameter of approximately 8.5 mmφ, and a length of approximately 300 mm. On one end of the rod, a dummy rod made of quartz glass having an outer diameter of approximately 23 mmφ and a length of 30 mm, and to the other end thereof, a supporting rod made of quartz glass having an outer diameter of approximately 25 mmφ and a length of 120 mm were respectively attached by glass welding. In this way, a core rod was prepared. This core rod was placed in a rubber mold having an inner diameter of approximately 70 mmφ. The aforementioned granulated powder was charged in a vacant space of the rubber mold, press-molded by a hydrostatic pressure of 98 MPa, with the result that an optical-fiber porous preform having an outer diameter of approximately 56 mmφ and a length of approximately 300 mm was obtained.

In a third step, the optical fiber porous preform was subjected to degreasing treatment in air for 5 hours at 500° C., dehydrated by a customary method in an He and $Cl_2$ atmosphere, at 1000° C. and subsequently subjected to vitrifying treatment at 1600° C. in an He atmosphere. In this way, the optical-fiber preform was produced. This preform was then subjected to conventional heat-drawing, resulting in a single-mode optical fiber of 125 μm in outer diameter.

The single-mode optical fiber was drawn in an extension ratio of 0.7% based on the entire length thereof and screened for breakage. No breakage was observed in the optical fiber. No occurrence of the breakage is presumably ascribed to the fact that no impure particles were attached to the silica powder. In the present Example, the case was explained in which the pressing was used as the powder forming method; whereas, the same effects as above can be obtained even if other powder forming method was employed after impure particles are removed by stirring the silica powder in an alkaline liquid phase.

(COMPARATIVE EXAMPLE 1)

An optical fiber porous preform was produced in the same manner as in Example 1 except that impure particles were not removed by stirring silica powder in an alkaline liquid phase. The resultant preform was subjected to degreasing, dehydration, and vitrifying treatments according to a customary method. In this way, an optical-fiber preform was obtained. The preform was further drawn to form a single-mode optical fiber.

When the entire single-mode optical fiber was subjected to a screening test in the same manner as in Example 1, breakage was observed in a rate of 0.4 locations/km. The occurrence of the breakage is presumably ascribed to the fact that impure particles were attached to the silica powder.

(EXAMPLE 2)

Hereinbelow, the second aspect of the present invention will be described.

First, a slurry was prepared by mixing and stirring a mixture consisting of 98 parts by weight of the silica powder having a particle diameter of 15 μm, 2 parts by weight of silica fine particles having a diameter of 0.2 μm, both were manufactured by the gas-phase synthesis method, 67 parts by weight of pure water serving as a solvent, 1.6 parts by weight of a polyvinyl alcohol and 1.2 parts by weight of glycerine as a binder. The slurry was granulated by the spray-dry method resulting in granulated powder having an average diameter of 100 μm. The diameter of added fine particles satisfied a formula (I).

This granulated powder was charged in a rubber mold having an inner diameter of approximately 70 mmφ. The rubber mold was pressurized by a hydrostatic pressure of 98 MPa, resulting in an optical-fiber porous preform having an outer diameter of approximately 58 mmφ and a length of approximately 300 mm. Thereafter, the porous preform was degreased for 5 hours at 500° C. in air, and then dehydrated at 1000° C. in an He and $Cl_2$ gas atmosphere according to a customary method. Finally, the resultant preform was vitrified at 1600° C. in an He atmosphere in accordance with a customary method, with the result that a PCS optical fiber preform was obtained. In this way, 20 pieces of the PCS optical-fiber preform were produced.

In the present Example, since silica fine particles enter into a space formed between silica powder particles and increases the number of contact points between a silica powder particle and fine particles, thereby providing an excellent mechanical strength, all 20 pieces of PCS optical fiber preform were formed without a defect such as breakage. The resultant PCS optical-fiber preform was drawn to form an optical fiber having a core diameter of 200 μm and a clad diameter of 230 μm. The characteristics of the optical fiber were the same as that obtained by a conventional method.

(COMPARATIVE EXAMPLE 2)

Granulated powder was prepared in the same manner as in Example 1 except that fine particles having a diameter of 3 μm not satisfying the formula (I) were added instead of silica fine particles of 0.2 μm in diameter. Using the granulated powder, 20 pieces of porous preform were formed.

The porous preform was subjected to a series of treatments to form a PCS optical-fiber preform in the same manner as in Example 1. However, all pieces of the PCS optical-fiber preform were broken due to poor mechanical strength of the preform during being transferred from the degreasing step to the dehydration step.

(COMPARATIVE EXAMPLE 3)

Granulated powder was obtained in the same manner as in Example 1 except that silica fine particles having a diameter of 0.2 μm were added in an amount of 1 part or less by weight instead of 2 parts. Using the granulated powder thus obtained, 20 pieces of porous preform were formed.

The porous preform was subjected to a series of treatments to form a PCS optical-fiber preform in the same manner as in Example 1. However, all pieces of PCS optical-fiber preform were broken due to poor mechanical strength during being transferred from the degreasing step to the dehydration step.

(COMPARATIVE EXAMPLE 4)

Granulated powder was obtained in the same manner as in Example 1 except that silica fine particles having a diameter of 0.2 μm were added in excess of 2 parts by weight instead of 2 parts. Using the granulated powder thus obtained, 20 pieces of porous preform were formed.

The porous preform was subjected to a series of treatments to form a PCS optical-fiber preform in the same manner as in Example 1. However, all pieces of the PCS optical-fiber preform were not put into practical use since a number of gas bubbles were generated after the vitrifying step.

(EXAMPLE 3)

A slurry was prepared by mixing and stirring a mixture consisting of 99 parts by weight of the silica powder having a particle diameter of 10 μm, 1 part by weight of silica fine particles having a diameter of 0.04 μm, both were manufactured by the vapor-phase synthesis method, 67 parts by weight of pure water serving as a solvent, 1.6 parts by weight of a polyvinyl alcohol and 1.2 parts by weight of glycerin as a binder. The slurry was granulated by the spray-dry method resulting in granulated powder having an average diameter of 100 μm. The diameter of added fine particles satisfied a formula (I).

In a second step, a quartz glass rod was formed by the VAD method. The quartz glass rod had a core/clad ratio of 1/3, a specific refractive index (Δ) of 0.3%, an outer diameter of 8.5 mmφ, and a length of approximately 300 mm. On one end of the rod, a dummy rod made of quartz glass, having outer diameter of approximately 23 mmφ and a length of 30 mm, and to the other end thereof, a supporting rod made of quartz glass, having an outer diameter of approximately 25 mmφ and a length of 120 mm were respectively attached by glass welding. In this way, a core rod was prepared.

This core rod was mechanically placed at the predetermined position in the center of a cavity of a rubber mold having an outer diameter of approximately 70 mm$\phi$. The aforementioned granulated powder was charged in the cavity. Subsequently, the rubber mold was pressurized by a hydrostatic pressure of 98 MPa, with the result that an optical-fiber porous preform having an outer diameter of approximately 56 mm$\phi$ and a length of 300 mm was obtained.

In a third step, the porous preform was subjected to degreasing treatment in air for 5 hours at 500° C., dehydrated by a customary method at 1000° C. in an He and $Cl_2$ atmosphere, and subsequently subjected to vitrifying treatment at 1600° C. in an He atmosphere. As a result, the single mode optical-fiber preform was obtained. In this way, 20 pieces of single-mode optical preform were prepared.

In the present Example, since silica fine particles enter into a space formed between powder particles and increases the number of contact points between a silica powder particle and fine particles, providing an excellent mechanical strength, all 20 pieces of single-mode optical fiber preform were formed without a defect such as breakage. The resultant single-mode optical-fiber preform was drawn to form an optical fiber having an outer diameter of 125 μm. The characteristics of the optical fiber were the same as that obtained by a conventional method.

(COMPARATIVE EXAMPLE 5)

Granulated powder was obtained in the same manner as in Example 2 except that fine particles having a diameter of 3 μm not satisfying the formula (I) was added instead of silica fine particles having a diameter of 0.04 μm. Using the granulated powder thus obtained, 20 pieces of porous preform were formed.

The porous preform was subjected to a series of treatments to form a single-mode optical-fiber preform in the same manner as in Example 2. However, 10 pieces of the preform were broken due to poor mechanical strength during being transferred from the decreasing step to the dehydration step.

(COMPARATIVE EXAMPLE 6)

Granulated powder was obtained in the same manner as in Example 2 except that silica fine particles having a diameter of 0.04 μm were added in an amount of 0.5 parts or less by weight instead of 1 part. Using the granulated powder thus obtained, 20 pieces of porous preform were formed.

The porous preform was subjected to a series of treatments to form a single-mode optical-fiber preform in the same manner as in Example 2. However, 5 pieces of the preform were broken due to poor mechanical strength during being transferred from the degreasing step to the dehydration step and cracks were developed in 3 pieces of the preform after the vitrifying step.

(COMPARATIVE EXAMPLE 7)

Granulated powder was obtained in the same manner as in Example 2 except that silica fine particles having a diameter of 0.04 μm were added in excess of 1 part by weight instead of 1 part. Using the granulated powder thus obtained, 20 pieces of porous preform were formed.

The porous preform was subjected to a series of treatments to form a single-mode optical-fiber preform in the same manner as in Example 2. However, all pieces of single-mode optical-fiber preform were not put into practical use since a number of bubbles were generated after the vitrifying step.

As explained above, according to the method of the first aspect of the present invention, an optical fiber porous preform can be obtained by the powder forming method using a silica powder as a main material from which impure particles have been removed by stirring the silica powder in an alkaline liquid phase. Hence, it is possible to obtain an optical fiber free from contamination with metal compounds and having sufficient mechanical strength. Owning to this method, a yield of the optical fiber production can be improved.

Further, according to the method of the second aspect of the present invention, an optical fiber porous preform can be obtained by the powder forming method from the forming material which is obtained by adding fine particles satisfying a formula:

$$d \leq \{(2/\sqrt{3}) - 1\} \cdot D \qquad (I)$$

(d: diameter of fine particles, D: diameter of silica powder) to a silica powder. Hence, it is possible to obtain an optical fiber porous form of high quality and excellent mechanical strength. Owning to this method, a yield of the optical fiber production can be improved.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a porous preform for an optical fiber, comprising the steps of removing impurity particles from silica powder using repulsion of charges by the steps of stirring the silica powder in an alkaline liquid phase whereby repulsion of charges between the silica powder and the impurity particles separates the impurity particles from the silica particles and maintains the impurity particles in suspension in the alkaline liquid phase;

separating the silica powder from the liquid phase suspension of the impurity particles; and obtaining said porous preform for an optical fiber by applying a powder forming method to said silica powder used as a main material.

2. The method according to claim 1, wherein said silica powder is pure $SiO_2$ powder or $SiO_2$ powder containing at least one element selected from the group consisting of Ge, B, Ti, Er, and Nd.

3. The method according to claim 1, wherein said impure particles are $ZrO_2$ particles or $Cr_2O_3$ particles.

4. The method according to claim 1, wherein said powder forming method is pressing.

5. The method according to claim 1, wherein said powder forming method is extrusion.

6. The method according to claim 1, wherein said powder forming method is casting.

7. The method according to claim 1, wherein said step of separating said silica powder from said alkaline liquid phase suspension is by settling.

8. A method of manufacturing a porous preform for an optical fiber, comprising the steps of removing impurity particles from silica powder using repulsion of charges by the steps of stirring the silica powder in an alkaline liquid phase whereby repulsion of charges between the silica powder and the impurity particles separates the impurity particles from the silica particles and maintains the impurity particles in suspension in the alkaline liquid phase;

separating the silica powder from the liquid phase suspension of the impurity particles;

preparing a molding material by adding fine particles having a particle diameter satisfying the following formula (I) to said silica powder; and obtaining said porous preform for an optical fiber by applying a powder forming method to said forming material:

$$d \leq \{(2/\sqrt{3})-1\} \cdot D \qquad (I)$$

wherein d: diameter of fine particles, and D: diameter of silica powder.

9. The method according to claim 8, wherein said impure particles are $ZrO_2$ particles or $Cr_2O_3$ particles.

10. The method according to claim 8, wherein said fine particles are pure silica fine particles or oxide fine particles containing at least one selected from the group consisting of Ge, P, Ti, Er, and Nd.

11. The method according to claim 8, wherein a method of adding said silica fine particles to said silica powder is one including the step of dispersing said silica powder and said silica fine particles homogeneously in dispersion medium and stirring said slurry.

12. The method according to claim 11, wherein said dispersion medium is water.

13. The method according to claim 8, wherein said porous preform for an optical fiber is one selected from the group consisting of a porous preform for a PCS fiber, a porous preform for image guide, a porous preform for rod lenses, a hybrid-type porous preform, and a porous preform, a core and a clad of which are formed by means of a powder forming method.

14. The method according to claim 8, wherein said powder forming method is pressing.

15. The method according to claim 8, wherein said powder forming method is extrusion.

16. The method according to claim 8, wherein said powder forming method is casting.

17. The method according to claim 8, further comprising a step of separating said silica powder from said alkaline liquid phase.

* * * * *